United States Patent
Chiappa et al.

(10) Patent No.: US 7,004,253 B2
(45) Date of Patent: Feb. 28, 2006

(54) PROCESS FOR REDUCING THE PRODUCTION OF WATER IN OIL WELLS

(75) Inventors: Luisa Chiappa, Nerviano-Milan (IT); Maria Andrei, Mediglia-Milan (IT); Thomas Paul Lockhart, Lodi (IT); Giovanni Burrafato, Tavazzano-Lodi (IT); Giuseppe Maddinelli, Milan (IT)

(73) Assignees: Eni S.p.A., Rome (IT); Enitecnologie S.p.A., San Donato Milanese (IT)

( * ) Notice: Subject to any disclaimer, the term of this patent is extended or adjusted under 35 U.S.C. 154(b) by 237 days.

(21) Appl. No.: 10/474,319

(22) PCT Filed: May 13, 2002

(86) PCT No.: PCT/EP02/05233

§ 371 (c)(1),
(2), (4) Date: Oct. 7, 2003

(87) PCT Pub. No.: WO02/097236

PCT Pub. Date: Dec. 5, 2002

(65) Prior Publication Data

US 2004/0144542 A1  Jul. 29, 2004

(30) Foreign Application Priority Data

May 25, 2001  (IT) ............... MI2001A1113

(51) Int. Cl.
*E21B 33/138* (2006.01)
*E21B 43/22* (2006.01)

(52) U.S. Cl. ............ 166/263; 166/295; 166/305.1; 507/222; 507/225; 507/229; 523/130

(58) Field of Classification Search ........... 166/263
See application file for complete search history.

(56) References Cited

U.S. PATENT DOCUMENTS

| | | | | |
|---|---|---|---|---|
| 4,484,631 A | * | 11/1984 | Sherwood et al. | 166/400 |
| 5,379,841 A | * | 1/1995 | Pusch et al. | 166/295 |
| 6,124,245 A | * | 9/2000 | Patel | 507/120 |
| 6,228,812 B1 | * | 5/2001 | Dawson et al. | 507/221 |
| 6,395,853 B1 | * | 5/2002 | Oswald et al. | 526/307.2 |
| 6,476,169 B1 | * | 11/2002 | Eoff et al. | 526/307.2 |
| 2004/0109838 A1 | * | 6/2004 | Morschhuser et al. | 424/70.16 |

FOREIGN PATENT DOCUMENTS

| | | |
|---|---|---|
| EP | 0 577 931 | 1/1994 |
| WO | 96/23849 | 8/1996 |
| WO | 00/20527 | 4/2000 |

* cited by examiner

*Primary Examiner*—George Suchfield
(74) *Attorney, Agent, or Firm*—Oblon, Spivak, McClelland, Maier & Neustadt, P.C.

(57) ABSTRACT

A process is described for reducing the production of water in oil wells, with temperatures of up to (90° C.), which comprises the injection in the formation around the well of an aqueous solution of one or more polymers selected from those having general formula (I) wherein: n ranges from (0.40) to (0.70), preferably from (0.5) to (0.65); m ranges from (0.15) to (0.65), preferably from (0.3) to (0.5); p ranges from (0.02) to (0.20), preferably from (0.05) to (0.10); n+m+p=1; $x_1$ is selected from H and $CH_3$; $R_1$, $R_2$ the same or different, are selected from $C_1$–$C_{10}$ monofunctional hydrocarbyl groups (I)

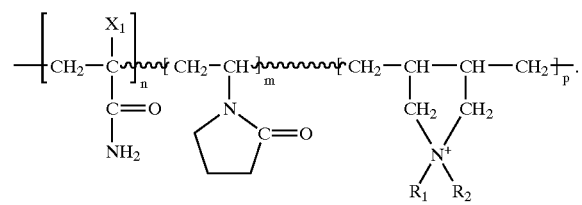

20 Claims, No Drawings

PROCESS FOR REDUCING THE PRODUCTION OF WATER IN OIL WELLS

The present invention relates to a process for reducing the production of water in oil wells, with temperatures of up to 90° C., which comprises the injection into the formation of an aqueous solution of a cationic polymer.

The coproduction of water is a fact which concerns, to varying extents and with different times, all oil or gas wells, and which can have strong negative economic repercussions. The excessive production of water in fact causes both an increase in the costs relating to the disposal of the water and also to a reduction in income due to the limited productivity of hydrocarbons.

In gas fields, moreover, a high water-cut (i.e. the ratio between the water flow-rate of a well and the total water+hydrocarbon flow-rate) can lead to the flooding of the well and consequently its closure.

Furthermore, in the future, problems associated with the production of water will become even more important in view of the characteristics of fields currently in production and of new exploration frontiers. The production of existing fields in fact (increasingly more mature) is normally characterized by a water-cut which increases with time. The exploration frontiers moreover are moving towards offshore reservoirs, often in deep water, and in areas often characterized by severe environmental regulations.

In wells with a high water-cut, the problem can generally be solved by the mechanical insulation of the production area or by recompletion or workover. The latter solution however is extremely onerous and can cause the loss of enormous volumes of hydrocarbons present in the microlevels still not influenced by the arrival of water.

"Water shut-off" interventions with gelifying chemical systems (usually polyacrylamides cross-linked with Cr(III) or with systems based on silicates), can represent a valid alternative to mechanical insulation; these compositions, injected into the formation, completely block the movement of the fluids in the zones treated. With this technique, it is possible to totally reduce or eliminate the production of water at accessible costs. This technology however only has a high probability of success when it is possible to identify and selectively insulate the water production areas during the treatment, so as not to damage production from the layers still saturated with hydrocarbons.

Finally, the RPM (Relative Permeability Modifier) technology is based on the injection, in all intervals open for production, of a chemical agent capable of selectively reducing the permeability to water. The chemical systems used in this type of treatment are hydrosoluble polymers which modify the permeability of the formation following adsorption on the rock surface. In this way, the permeability in the high water-cut intervals is selectively reduced, whereas the permeability of the intervals which produce hydrocarbons remains unaltered. Intervening with this approach, when appropriate, has numerous advantages with respect to the conventional technologies, in particular: (i) limit risk of damage, (ii) low environmental impact, (iii) low cost of the treatment thanks to interventions of the "bullheading" type.

The condition necessary for effective treatment with a permeability modifier polymer is that the polymer itself interacts with the rock surface creating a layer capable of modifying the flow properties of the porous medium. The polymer must therefore have a particularly strong attractive interaction with the rock surface, in order to maximize the adsorption and stability of the layer of adsorbed polymer, over a period of time.

The polymers used so far have various limitations which have delayed the diffusion of the RPM technology. In particular: polyacrylamides (PAM) have a poor efficacy and reduced duration of the treatment due to the limited thermal stability; polyacrylamides modified by the introduction of cationic groups have a good efficacy but low resistance to temperature; biopolymers (such as scleroglucan) have injectivity problems as a result of the high viscosity of the polymeric solution and its tendency to flocculate.

Experts in the field have consequently felt the necessity of finding polymers capable of being more effectively adsorbed on rock matrixes and therefore capable of selectively reducing the permeability to water and also resistant to the temperature of the formation.

It has now been found that particular cationic polymers adequately satisfy the above demands, and are particularly thermally stable at medium-high temperatures. Adsorption tests carried out on siliceous sand using polymers containing cationic groups and analogous non-ionic polymers have in fact demonstrated that the former are more strongly adsorbed on the rock with respect to the latter, as a result of the attractive interaction between the surface of the negatively charged sand and the positively charged polymer.

In accordance with this, the present invention relates to a process for reducing the production of water in oil wells which comprises the injection into the formation around the well of an aqueous solution of one or more polymers selected from those having general formula (I):

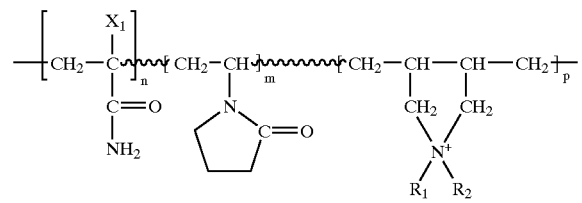

wherein n ranges from 0.40 to 0.70, preferably from 0.5 to 0.65;

m ranges from 0.15 to 0.65, preferably from 0.3 to 0.5;

p ranges from 0.02 to 0.20, preferably from 0.05 to 0.10;

n+m+p=1;

$X_1$ is selected from H and $CH_3$;

$R_1$, $R_2$, the same or different, are selected from $C_1$–$C_{10}$ monofunctional hydrocarbyl groups.

In the preferred embodiment, in the compound having general formula (I) the polymer has: n=0.65, m=0.3, p=0.05, $X_1$=H, $R_1$=$CH_3$, $R_2$=$CH_3$.

The molecular weight of the polymers usually ranges from 1.5 to 12 million.

The aqueous solution which can be used in the process of the present invention contains a quantity of polymer of the compound having general formula (I) preferably ranging from 300 to 10000 ppm, even more preferably from 500 to 4000 ppm.

Any type of water available provided it has no suspended solids, can be used as carrying medium, as the compound having general formula (I) is neither influenced by the type or quantity of anions and cations usually contained in water.

The aqueous solution of the present invention normally has a viscosity ranging from 1.5 to 10 cP, much lower values than those of the gelifying solutions.

The volume of aqueous solution to be injected into the formation depends on the height of the production formation to be treated and on the depth to which the solution must penetrate (invasion radius).

The flow-rate of the aqueous solution to be injected is selected in relation to the type of formation to be treated. Furthermore the aqueous solution to be injected can be fed into the formation at the desired pressure, provided this is not higher than the fracture pressure. It is known to experts in the field that it is advantageous for the solution to be injected as rapidly as possible, compatibly with the characteristics of the formation, in order to reduce the treatment time and consequently production stoppage, to the minimum.

When considered necessary, the process of the present invention can be preceded by an optional pretreatment step (preflush) which can be carried out for example with an aqueous solution containing a surface-active agent, in order to clean the formation to be treated and obtain a more effective adsorption of the polymer.

In the preferred embodiment, the process of the present invention is preferably followed by an overflush step, i.e. treatment of the formation with brine or gas or oil, in order to push the polymer into the formation. The overflush with gas also has the purpose of re-establishing the connectivity of the gas layer (in gas wells).

Finally, at the end of the injection of the aqueous solution of the compound having general formula (I), a shut-in step is preferably effected, i.e. closure of the well to allow a more effective adsorption of the polymer on the rock matrix.

The process of the present invention has many advantageous aspects, and in particular requires limited quantities of polymer having general formula (I). Furthermore it has the unexpected advantage of being applicable to both gas and oil formations, with temperatures up to about 90° C.

The following examples are provided for a better understanding of the present invention.

EXAMPLES

The polymer (called DP/PT 2130, produced by Floerger) used in the examples has the following formula. This is a terpolymer (AM-NVP-DADMAC) obtained from the polymerization of three monomers:

acrylamide (AM), N-vinylpyrrolidone (NVP), diallyldimethylammoniumchloride (DADMAC). The polymer has a molecular weight equal to 5 million.

For comparative purposes, in the experimental part another cationic polymer is also used, which is not a part of the invention. This is a cationic polymer (MCAT, produced by MI Drilling Fluids), a poly{acrylamide-acrylamide-(methyltrimethylammonium)} copolymer. The polymer has a molecular weight equal to 2 million.

Both products are in the form of a white powder.

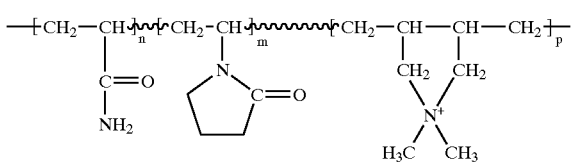

Chemical Structure of the Polymer DP/PT 2130

(n=0.65, m=0.30, p=0.05)

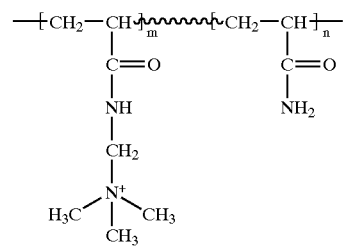

Chemical Structure of the Cationic Polymer MCAT (p=0.95, q=0.05)

Example 1

Performances of the Cationic Polymers DP/PT 2130 and MCAT

The performances of the polymers MCAT and DP/PT 2130 were evaluated by means of: a) Adsorption test on sand of the solutions; b) Thermal stability evaluation by means of NMR analysis; c) Core test 1a—Static Adsorption Test at a Temperature of 25° C.

The polymer solutions were prepared in brine (filtered and degassed solution of KCl2%) at concentrations of 1000 or 2000 ppm. After putting a certain quantity of sand (3–5 g) in contact with the polymeric solution in a hermetically sealed glass container, the solution with the sand is put under stirring at the desired temperature to favour contact between the polymer and surface of the sand. After about 24 hours at 25° C., the quantity of polymer adsorbed at the interface is determined by difference (between that initially charged and that remaining in the solution after the test) by means of TOC analysis (Total Organic Carbon).

The tests were carried out using sand with a prevalently siliceous and clay composition. Table 1 shows a comparison between the adsorption values of the polymer DP/PT 2130 and of the comparative polymer MCAT.

Table 1. Adsorption comparison, at 25° C., of solutions of the polymer DP/PT 2130 on sand (quartzite and reservoir) and analogous solutions of the MCAT polymer. The reservoir sand used has the following composition:

reservoir sand 1: quartz 50%, K-feldspar 6%, plagioclase 15%, calcite 6%, dolomite 1%, clays/micas 22% reservoir sand 2: quartz 92%, K-feldspar 5%, plagioclase 2%, clays/micas 1%

TABLE 1

Adsorption at 25° C. of solutions of the polymer DP/PT 2130 on sand (quartzite and reservoir) and of analogous solutions of the polymer MCAT.

|  | Temp. (° C.) | Conc. solution (ppm) | Adsorption (mg/g sand) DP/PT 2130 | Adsorption (mg/g sand) MCAT |
|---|---|---|---|---|
| Quartzite | 25 | 1000 | 0.12 | 0.13 |
|  | 25 | 2000 | — | 0.32 |
| Reservoir 1 | 25 | 1000 | 1.01 | 0.7 |
|  | 25 | 2000 | 1.45 | 1.15 |
| Reservoir 2 | 25 | 1000 | 0.81 | 0.87 |
|  | 25 | 2000 | 0.72 | 1.74 |

It can be observed that both polymers have a limited adsorption on clean sand (quartzite) and a high adsorption on both reservoir sands.

1b1—Temperature Static Adsorption Test

Following the procedure described in 1a, adsorption tests were effected on sand at temperatures of 70° C. and 90° C., using the polymer MCAT and the polymer of the present invention.

The results of the test are indicated in Table 2.

TABLE 2

Comparison of the adsorption of solutions of the polymer DP/PT 2130 on sand (quartzite and reservoir) and analogous solutions of the polymer MCAT. The composition of the reservoir sands is indicated in the description of Table 1.

|  | Temp. (° C.) | Conc. solution (ppm) | Adsorption (mg/g sand) DP/PT 2130 | Adsorption (mg/g sand) MCAT |
|---|---|---|---|---|
| Quartzite | 70 | 1000 | — | 0.035 |
| Quartzite | 90 | 1000 | 0.13 | 0.058 |
| Reservoir sand 1 | 70 | 1000 | 1.25 | 0.4 |
|  | 70 | 2000 | 1.93 | 0.8 |
| Reservoir sand 1 | 90 | 1000 | 0.86 | 0.64 |
|  | 90 | 2000 | 1.82 | 1.71 |
| Reservoir sand 2 | 90 | 1000 | 0.77 | 0.85 |
|  | 90 | 2000 | 1.4 | 1.76 |

It can be observed that both polymers have high adsorptions on the reservoir sands (compare with the data of Table 1), a necessary but not sufficient condition for the success of the RPM treatment.

For successful treatment, in fact, the thermal stability of the polymer must also be considered, in particular of the active cationic group, at the desired temperature.

1b2—Evaluation of the Thermal Stability by Means of NMR Analysis

The thermal stability of the product was evaluated by means of NMR analysis carried out on aqueous solutions of the polymers DP/PT 2130 and MCAT at different temperatures, and in particular the concentration of active cationic groups present at the different temperatures was determined.

Table 3 provides a comparison between the thermal stability of the polymer MCAT (in terms of percentage of cationic groups hydrolyzed at the test temperature) and the polymer DP/PT 2130 of the present invention.

TABLE 3

Comparison between the thermal stability of the solution of the polymer MCAT and of the solution of the polymer DP/PT 2130 of the present invention after 21 days (via NMR analysis)

| Temp. (° C.) | Time (weeks) | MCAT % of cationic groups hydrolyzed | DP/PT 2130 % of cationic groups hydrolyzed |
|---|---|---|---|
| 48 | 3 | 58 | n.d. |
| 70 | 3 | >99 | n.d. |
| 90 | 3 | n.d. | 0 | n.d. = not detected

A significant degradation of the active cationic groups of the polymer MCAT can already be observed at 70° C.

The polymer of the present invention, DP/PT 2130, is, on the other hand, thermally stable also at a temperature of 90° C.

1-c—Test in a Porous Medium Using the Polymer MCAT

After verifying the adsorption of the polymer on-rock, the efficacy of the polymer MCAT was evaluated in selectively reducing permeability to water by means of a test in a porous medium. Two tests were effected in a porous medium at two different temperatures: 48 and 70° C.

The sandpack was prepared using about 40 grams of sand, so as to obtain a core length equal to about 5 cm to which 2 cm of gravel having 20–40 mesh, are added, one at the head and one at the tail, held by two 70-mesh metallic nets. The diameter of the sandpack is equal to 1".

Once the sandpack has been assembled in the Hassler steel cell, a boundary pressure of 20 bars is established to avoid the bypassing of the fluids between the VITON tube (which contains the core) and the porous medium. The following procedure is adopted:

Saturation under vacuum of the sandpack with brine (2% KCl) and subsequent determination of the porosity and absolute permeability at room temperature and at the temperature of interest.

Flush of the brine with gas (nitrogen previously humidified) or oil (crude field oil): determination of the initial permeability relating to the gas ($K_{in}$ gas) or crude field gas ($K_{in}$ crude field oil) and the corresponding saturation in water.

Flush of the gas (or crude field oil) with brine: determination of the initial permeability relating to the brine ($K_{in}$ brine) and the corresponding saturation in gas (or crude field oil).

Injection of the polymeric solution of MCAT (1500 ppm) previously filtered and degassed (from 10 to 12 pore volumes) at a constant flow-rate. During the flush the pressure values are collected together with the outgoing fractions to determine the quantity of polymer adsorbed.

Shut-in of 24 hours.

Flush of the polymer with brine (2% KCl) at a constant flow-rate (about 1 PV/h). During the flushing the pressure vales are recorded and the outgoing fractions collected.

Determination of the permeability to brine after the treatment with the polymer ($K_{fin}$ brine).

Determination of the permeability to gas or oil (crude field oil) after the treatment with the polymer ($K_{fin}$ gas, $K_{fin}$ crude field oil) and of the saturation in brine.

The results of the tests are summarized in Table 4.

TABLE 4

Results of the test in a porous medium with the polymer MCAT (1500 ppm). The reduction in permeability to water was calculated after injecting from 600 to 900 pore volumes (PV) of brine. The reservoir sand used has the following composition: reservoir sand 3: quartz 49%, plagioclase 17%, calcite 21%, clays/micas 4%.

| Sand | Temp. (° C.) | K initial brine (mD) | Reduction brine permeability (%) | Reduction gas permeability (%) |
|---|---|---|---|---|
| Reservoir 3 | 48 | 78 | 77 | 20 |
| Reservoir 3 | 70 | 122 | 22 | — |

It can be observed that the polymer MCAT is effective as permeability modifier relating to a temperature of about 50° C. At 70° C. the reduction in permeability to brine is significantly reduced with respect to what is observed at lower temperatures (22% against 77%). This is in accordance with the data of the static adsorption tests and with the NMR analyses carried out on the solutions, which showed a considerable degradation of the polymer MCAT at 70° C. with an almost complete detachment of the active cationic groups. The cationic group is essential for obtaining a good adsorption and consequently a good reduction in the permeability to brine.

Example 2

Performances of the Polymer DP/PT 2130 of the Present Invention

Once the thermal stability of the polymer DP/PT 2130 has been defined, whose solutions proved to be stable at temperatures equal to 90° C., with good performances in terms of sand adsorption, the performances of the product were evaluated by means of tests in a porous medium, in which the reduction in permeability to brine and the effect on permeability to hydrocarbons (oil), were evaluated.

2-a—Tests in a Porous Medium

In the tests in a porous medium, carried out with the purpose of evaluating the efficacy of the polymer DP/PT 2130 in reducing permeability to brine, the procedure described in Example 1-c was adopted. Also in this case, a polymeric solution (in brine KCl 2%) of 1500 ppm, was used. The following tests were carried out:

test in a porous medium on sandpack (reservoir sand 2) at 90° C.: determination of the reduction in permeability relating to brine and evaluation of the effect on the permeability relating to oil. The reservoir sand (2) used has the mineralogical composition indicated in the description of Table 1.

test in a porous medium on core (clashach) at 90° C.: determination of the reduction in permeability relating to brine and evaluation of the effect on the permeability relating to oil. The core (length 10 cm, diameter 2.54 cm, pore volume 9.28 cm$^3$) has the following mineralogical composition: quartz 95%, K-feldspar 5%.

In the tests in the porous medium carried out with the brine-oil biphasic system, a crude field oil was used.

The results of the test are indicated in Table 5.

TABLE 5

Tests in a porous medium effected with the polymer DP/PT 2130. A typical crude field oil was used in all the tests.

| Core | Temperature (° C.) | Concentr. DP/PT 2130 (ppm) | Initial permeabil. brine (mD) | Reduction permeabil. brine (%) | Reduction permeabil. oil (%) |
|---|---|---|---|---|---|
| Clashach | 90 | 1500 | 474 | 48 | 5 |
| Sandpack 1* | 90 | 3000 | 288 | 50 | 5 |
| Sandpack 2* | 90 | 5000 | 154 | 70 | 9 |

*reservoir sand 2 (see description of Table 1)

It can be observed that, unlike the polymer MCAT whose performances were seriously jeopardized at high temperatures due to the degradation of the active cationic groups, the polymer of the present invention provides excellent performances, in terms of selective reduction in permeability to water also at high temperatures. These properties make the polymer suitable for RPM treatment in wells with problems relating to water production and with formation temperatures of up to 90° C.

The invention claimed is:

1. A process for reducing the production of water in an oil well, comprising:
   injecting into a formation around the well an aqueous solution of one or more polymers of formula (I):

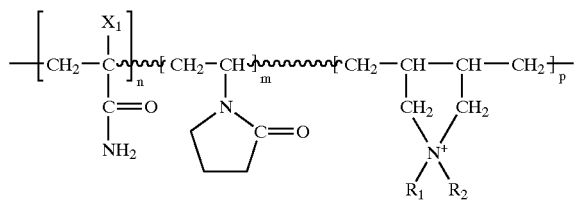

wherein
n is from 0.40 to 0.70;
m is from 0.15 to 0.65;
p is from 0.02 to 0.20;
n+m+p =1;
$X_1$ is selected from the group consisting of H and $CH_3$;
$R_1$, $R_2$, may be the same or different $C_{1-10}$ monofunctional hydrocarbyl groups.

2. The process according to claim 1, wherein n is from 0.5 to 0.65, m is from 0.3 to 0.5, and p is from 0.5 to 0.10.

3. The process according to claim 1, wherein $R_1$, $R_2$, may be the same or different $C_{1-3}$ monofunctional alkyl radicals.

4. The process according to claim 3, wherein $R_1=R_2=CH_3$.

5. The process according to claim 1, wherein the polymer of formula (I) has a molecular weight of from 1.5 to 12 million.

6. The process according to claim 1, wherein the concentration of the polymer of formula (I) in the aqueous solution is from 300 to 10000 ppm.

7. The process according to claim 6, wherein the concentration of the polymer of formula (I) in the aqueous solution is from 500 to 4000 ppm.

8. The process according to claim 1, wherein the polymer of formula (I) n=0.65, m=0.30, p=0.05, $X_1$=H, and $R_1=R_2=CH_3$.

9. The process according to claim 1, further comprising: first preflushing the formation.

10. The process according to claim 9, wherein the preflushing is carried out by injecting an aqueous solution containing a surface-active agent into the formation.

11. The process according to claim 1, further comprising: overflushing after the injecting.

12. The process according to claim 11, wherein the overflushing includes injecting at least one of a brine, a gas, and an oil, in the formation.

13. The process of claim 1, wherein the aqueous solution has a viscosity of 1.5 to 10 cP.

14. The process of claim 1, further comprising:
after the injecting, closing the well to adsorb the polymer in a rock matrix.

15. The process of claim 1, wherein the temperature of the formation is up to 90° C.

16. The process of claim 1, wherein the aqueous solution comprises a terpolymer comprising a copolymerized units of acrylamide, N-vinylpyrrolidone, and diallyldimethylammoniumchloride.

17. The process of claim 16, wherein the polymer has a molecular weigh of about 5 million.

18. The process of claim 1, further comprising:
before the injecting, preflushing the well with an aqueous solution containing a surface active agent;
after the injecting, overflushing the well with at least one of a brine, a gas and an oil; and then
closing the well to adsorb the polymer on the formation.

19. The process of claim 1, wherein the formation contains siliceous sand.

20. The process of claim 1, wherein the aqueous solution is injected as rapidly as possible at a pressure that is not higher than the fracture pressure of the formation.

* * * * *